July 7, 1959  C. A. SHORT, JR., ET AL  2,893,353
THREE POSITION ACTUATOR CYLINDER
Filed Aug. 13, 1954  2 Sheets-Sheet 1

INVENTORS
Clair A. Short, Jr.,
William S. Castle &
David E. Schnable
By Paul Fitzpatrick
Attorney INVENTORS
Clair A. Short, Jr.,
William S. Castle &
David E. Schnable
By Paul Fitzpatrick
Attorney

United States Patent Office 2,893,353
Patented July 7, 1959

2,893,353

THREE POSITION ACTUATOR CYLINDER

Clair A. Short, Jr., Indianapolis, and William S. Castle and David E. Schnable, Speedway, Ind., assignors to General Motors Corporation, Detroit, Mich., a corporation of Delaware Application August 13, 1954, Serial No. 449,726

4 Claims. (Cl. 121—38)

This invention relates to a fluid pressure actuating device or power cylinder which may be operated by fluid under pressure to move an actuated device selectively to any one of three predetermined positions. The principal object of the invention is to provide a positive actuator which, under control of a valve movable to three positions, is capable of moving a device to be actuated to three corresponding positions. A further object of the invention is to provide a device of such character which is simple and dependable. The principles of the invention are equally applicable to operation by liquids or gases under superatmospheric or subatmospheric pressure, but for simplicity hereinafter it will be assumed that the device is actuated by air under pressure.

Referring to the drawings.

Figure 1:
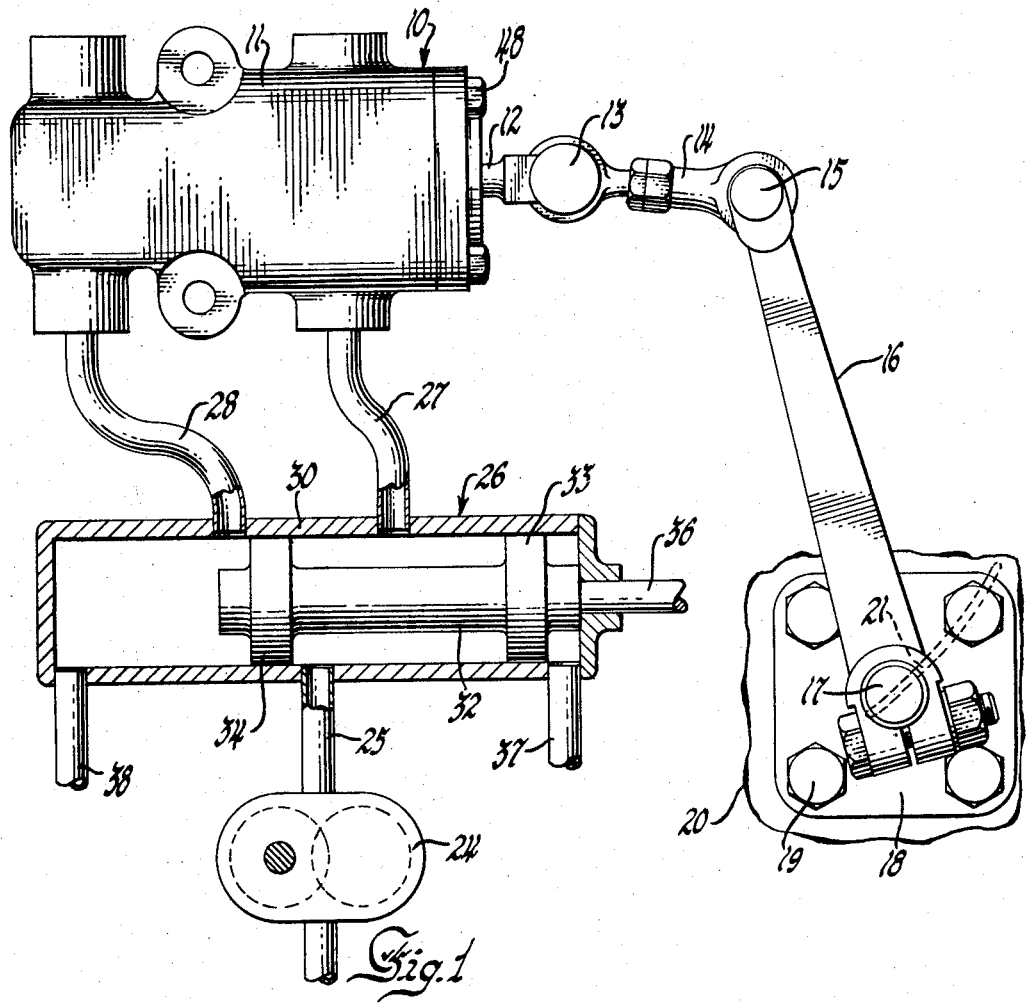
Figure 1 is a somewhat schematic view of an actuating system embodying the invention.

Referring first to Figure 1 the actuator device 10 comprises a body or cylinder 11 from which extends a piston rod 12 connected by pin 13, link 14 and pin 15 on arm 16 mounted on a shaft 17 rotatable in a support 18 secured by cap screws 19 to a casing 20 which may be, for example, the casing of an axial flow compressor. The shaft 17 may vary the angular position of the vanes of the compressor as indicated in a schematic manner by the vane 21 which may, for example, be coupled to the shaft 17 for rotation about a spanwise axis.

Air under pressure may be supplied by a compressor or a pump 24 through a line 25, valve 26, and lines 27 and 28 to the ends of the cylinder 11. The valve 26 may be of any suitable type adapted to connect either or both of lines 27 and 28 to the pump 24 and, when only one is connected to the pump, to vent the other line. A spool valve suitable for the purpose is illustrated and, as shown, comprises a cylinder 30 within which is reciprocable a spool 32 having lands 33 and 34 adjacent the ends thereof. The spool may be reciprocated by a rod 36 which may be actuated manually or by any suitable means. The fluid pressure line 25 enters the cylinder 30 at the middle and vent ports 37 and 38 are located at the end of the cylinder. With the valve in the position shown, line 27 is connected to pressure supply and line 28 is vented. If the spool is moved to the other end of the cylinder these conditions are reversed, and if the spool is centered in the cylinder both lines 27 and 28 are connected to the supply line 25. Corresponding to these three conditions of fluid supply there are three positions of the piston rod 12 as will be seen.

Figure 2:
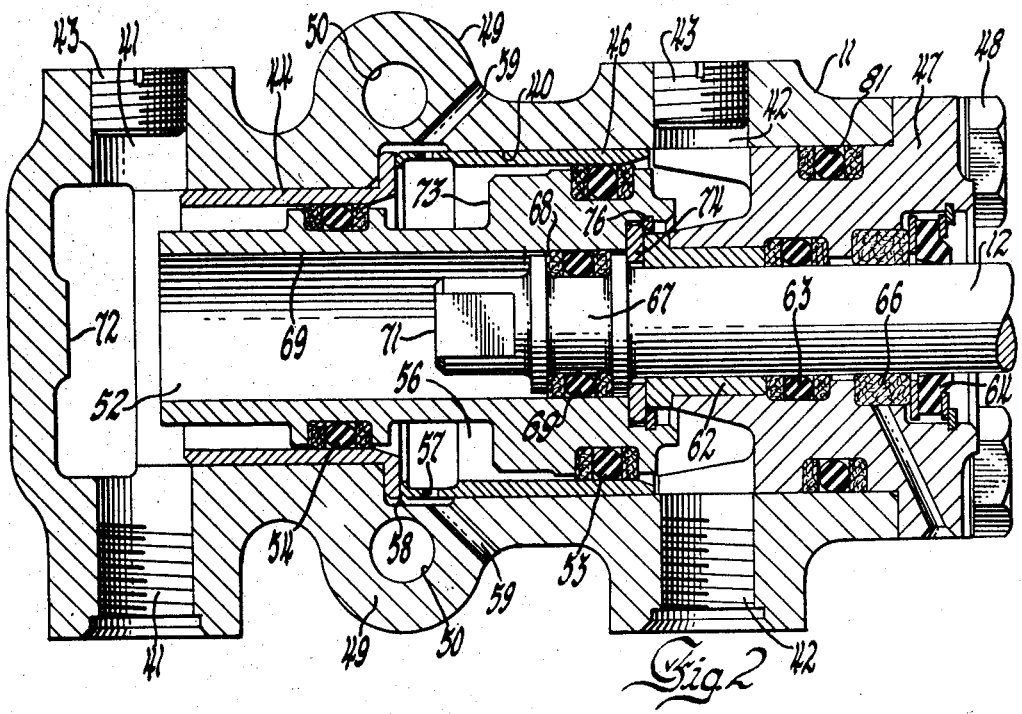
Figure 2 is a longitudinal sectional view of the actuator cylinder of the invention with the parts in one position.
Figure 3:
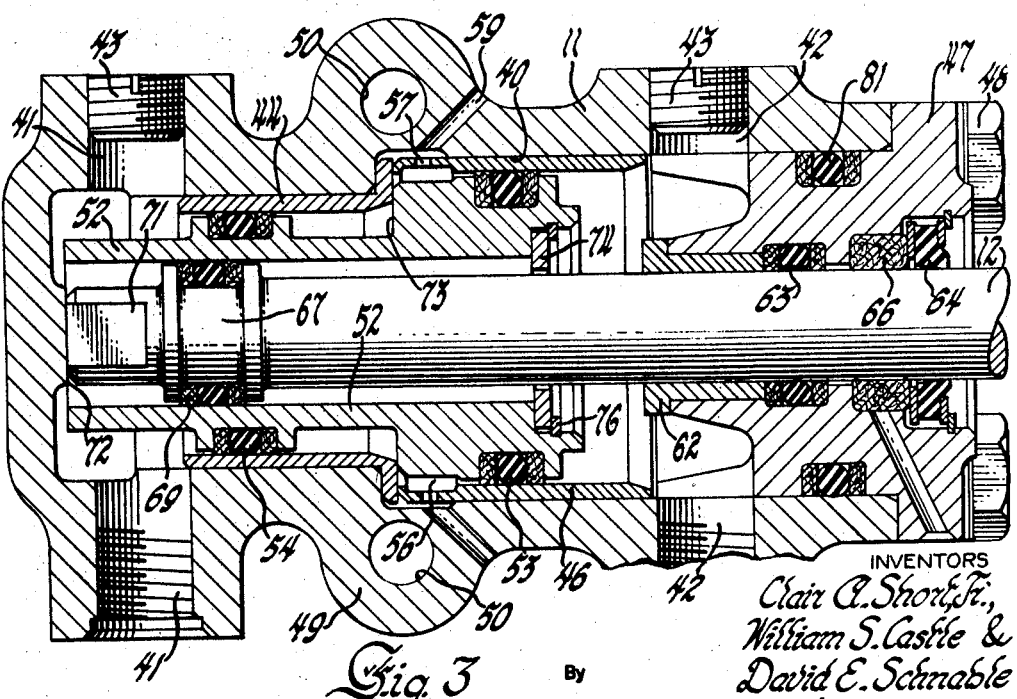
Figure 3 is similar to Figure 2, with the parts in another position.

Referring now to Figures 2 and 3, Figure 3 shows the actuator with the piston rod 12 fully retracted, as in Figure 1, and Figure 2 shows the piston rod fully extended. In the third position of the actuator, which is not illustrated, the piston rod is intermediate the positions of Figures 2 and 3. Referring now to Figure 2, the actuator or cylinder is a body of roughly rectangular cross section with a longitudinally extending bore 40, the left end of which is of reduced diameter. Air entrance ports 41 are provided at the left or smaller end of the cylinder and ports 42 at the right or larger end of the cylinder. The ports are duplicated for convenience in installation, and as shown, one port of each pair is closed by plugs 43. Port 41 is connected to line 28 and port 42 to line 27. A flanged cylinder liner 44 mounted in the smaller end of the cylinder seats against the shoulder of the cylinder and a second cylinder liner 46 mounted in the larger end of the cylinder engages the end of the liner 44. These liners may be pressed into place. The right-hand of the cylinder is closed by a head or plug 47 retained by cap screws 48 entering the body 11. Bosses 49 extending from the body provide holes 50 for mounting bolts.

Mounted within the cylinder 11 is a stepped hollow piston 52 each end of which is provided with a circumferential groove within which ride piston rings or seals 53 and 54 respectively engaging the liners 46 and 44. These seals are of known type. It will be apparent that the right face of piston 52 is exposed to pressure from port 42 and the left face is exposed to pressure from port 41. The chamber 56 between the seals 54 and 53 is vented to atmosphere through ports 57 in the sleeve, a recess 58 in the wall of the cylinder bore, and bores 59. The piston rod 12 is guided in the bushing 62 in the head 47 and in seals 63 and 64 and is lubricated by an oil packing 66. A spool-shaped piston 67 is integral with the rod 12. This piston comprises seals or rings 68 of known type which ride within the bore 69 in the interior of piston 52. A boss 71 extending from piston 67 engages a boss 72 at the end of the cylinder when the piston is at its leftmost limit of travel illustrated in Figure 3. The outer piston 52 has a shorter stroke to the left than piston 67, the stroke being limited by engagement of the shoulder 73 of the piston with the cylinder liner 44 (Figure 3).

Travel of piston 67 and rod 12 to the right is limited by engagement of the piston with a stop ring 74 mounted in piston 52 by a snap ring 76. Travel of piston 52 to the right is limited by engagement of stop ring 74 with the face of bushing 62.

A seal 81 is provided between the cylinder head 47 and the cylinder body 11.

The operation of the device will presumably be apparent but may be explained briefly as follows: The area of piston 52 exposed to pressure from line 27 is greater than that exposed to pressure from line 28, so if pressure is supplied from both lines piston 52 moves to the left as shown in Figure 3; likewise, if pressure is supplied only through line 27. If pressure is supplied only through line 28 it moves to the right.

Piston 67 is also a differential piston. The effective area of the left face of the piston is greater because of the piston rod area. Therefore, this piston tends to move to the right except when pressure is supplied to the right face of the piston and no pressure is supplied to the left face as in Figure 3. Thus when pressure is applied only through line 28 to port 41 both pistons move to the right to the position of Figure 2. If the pressure is maintained through line 28 and is applied also through line 27, piston 52 moves to the left, carrying piston 67 and rod 12 with it until piston 52 reaches the position illustrated in Figure 3, with piston 67 against stop ring 74, which is an intermediate point of the stroke of the piston rod. This is due to the fact that the differential of area of piston 52 is greater than that of piston 67. If pressure is maintained in line 27 and released in line 28 the pressure at the right of piston 67 moves it to the left until the piston engages the end of the cylinder as in Figure 3.

The structural simplicity and ruggedness, and the positive nature of the operation of the device, will no doubt be apparent. It may be applied to various situations where three positive positions rather than two are desired from a cylinder without the necessity of providing servo or follow-up valves.

Many modifications within the scope of the invention may be made by the exercise of skill in the art.

We claim:

1. An actuator comprising in combination, a cylinder having two portions of different diameter with pressure fluid ports at the ends thereof, a stepped piston having two heads engaging the walls of the two portions of the cylinder, respectively, and reciprocable therein in response to pressure fluid admitted through either of said ports and having a larger effective area directed toward one end of the cylinder than toward the other, a second differential area piston reciprocable within the stepped piston in response to pressure fluid admitted through either of said ports and having a larger effective area directed toward the said other end of the cylinder than toward the said one end, the effective difference of areas of the stepped piston being greater than the effective difference of areas of the second piston, the stroke of the stepped piston being shorter than that of the second piston, spaced abutment means engageable by said first piston to limit the stroke thereof, mutually engageable abutments on said pistons so located that said first piston will limit the stroke of said second piston when said first piston engages one of said spaced abutment means and will allow full stroke of said second piston when said first piston engages the other of said spaced abutment means, and means for connecting the second piston to a device to be actuated.

2. A fluid pressure actuator comprising, in combination, a cylinder having first and second ends, the cylinder having a portion at the first end thereof of area A, a portion at the second end thereof of area B, area A being greater than area B, and outer piston reciprocable in the cylinder having two heads, a head in the first end portion exposed to pressure in the first end and a head in the second end portion exposed to pressure in the second end, means for introducing fluid under pressure alternatively to either end of the cylinder or to both ends thereof, an open vent from the cylinder between the piston heads, the outer piston having an internal bore, an inner piston reciprocable in the bore, means for connecting the inner piston to a device to be actuated, the inner piston having opposed faces communicating with the ends of the cylinder through the bore, the face communicating with the first end being of effective area C and the face communicating with the second end being of effective area D, area D being greater than area C, and abutment means between the pistons limiting the movement of the inner piston toward the first end of the cylinder in dependence upon the position of the outer piston, the quantity A minus B being greater than the quantity D minus C.

3. A fluid pressure actuator comprising, in combination, a body defining a cylinder having fluid ports at the ends thereof, the cylinder being a stepped cylinder having a first portion of larger area at the first end thereof and a second portion of smaller area at the second end thereof, an outer double piston having two piston heads, one reciprocable in each portion of the cylinder, the cylinder defining a vent port between the two piston heads, means defining limits of movement of the outer piston at each end of its range of movement, the outer piston having an internal bore therein axially of the piston, an inner piston reciprocable in the bore and having opposed faces exposed to pressure from the said ports through the said bore, the face directed toward the smaller end of the cylinder having a greater effective area than the other face, abutment means between the outer and inner pistons engageable upon movement of the inner piston toward the first end of the cylinder, and means for connecting the inner piston to a device to be actuated, the difference of effective area of the piston heads of the outer piston being greater than the difference of effective area of the faces of the inner piston opposed thereto, and the stroke of the inner piston being longer than the stroke of the outer piston, and abutment means defining a first position of the inner piston when fluid under pressure is supplied only to the first end of the cylinder, the abutment means between the two pistons defining a second, intermediate, position of the inner piston when fluid under pressure is supplied to both ends of the cylinder, and the inner piston having a further travel beyond the intermediate position when fluid under pressure is supplied only to the second end of the cylinder, thus moving both pistons toward the first end of the cylinder.

4. A fluid pressure actuator comprising, in combination, a body defining a cylinder having fluid ports at the ends thereof, the cylinder being a stepped cylinder having a first portion of larger area at the first end thereof and a second portion of smaller area at the second end thereof, an outer double piston having two piston heads, one reciprocable in each portion of the cylinder, the cylinder defining a vent port between the two piston heads, abutment means between the outer piston and cylinder defining limits of movement of the outer piston at each end of its range of movement, the outer piston having an internal bore therein axially of the piston, an inner piston reciprocable in the bore and having opposed faces exposed to pressure from the said ports through the said bore, abutment means between the outer and inner pistons engageable upon movement of the inner piston toward the first end of the cylinder, and means for connecting the inner piston to a device to be actuated, the difference of effective area of the piston heads of the outer piston being greater than the difference of effective area of the faces of the inner piston opposed thereto, and the stroke of the inner piston being longer than the stroke of the outer piston, the abutment means between the inner piston and cylinder defining a first position of the inner piston when fluid under pressure is supplied only to the first end of the cylinder, the abutment means between the two pistons defining a second, intermediate, position of the inner piston when fluid under pressure is supplied to both ends of the cylinder, and the inner piston having a further travel beyond the intermediate position when fluid under pressure is supplied only to the second end of the cylinder, thus moving both pistons toward the first end of the cylinder.

References Cited in the file of this patent

UNITED STATES PATENTS

| | | |
|---|---|---|
| 787,479 | Tanner | Apr. 18, 1905 |
| 2,716,965 | Klamp | Sept. 6, 1955 |

FOREIGN PATENTS

| | | |
|---|---|---|
| 42,315 | Austria | May 25, 1910 |
| 490,730 | Great Britain | Aug. 19, 1938 |
| 640,086 | Great Britain | July 12, 1950 |